("12") United States Patent
Guichard et al.

(10) Patent No.: US 7,742,477 B1
(45) Date of Patent: Jun. 22, 2010

(54) INTERCONNECTIVITY BETWEEN AUTONOMOUS SYSTEMS

(75) Inventors: James N. Guichard, Groton, MA (US); Robert Hanzl, Hostivice (CZ); Mohammed Sayeed, Shrewsbury, MA (US); Sumit Mukhopadhyay, Shrewsbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 832 days.

(21) Appl. No.: 11/347,182

(22) Filed: Feb. 3, 2006

(51) Int. Cl.
*H04L 12/56* (2006.01)

(52) U.S. Cl. .................. 370/392; 370/395.31; 370/471; 709/222

(58) Field of Classification Search .................. 370/392, 370/352, 252, 400, 474, 395.41, 471, 228, 370/395.53, 254, 401; 709/238, 236, 232, 709/239, 243, 244, 245; 307/216, 346, 389, 307/400, 466, 241
See application file for complete search history.

(56) References Cited

U.S. PATENT DOCUMENTS

| | | | |
|---|---|---|---|
| 6,680,940 B1 * | 1/2004 | Lewin et al. ................. | 370/389 |
| 7,116,665 B2 * | 10/2006 | Balay et al. .................. | 370/392 |
| 7,152,115 B2 * | 12/2006 | Ould Brahim et al. ...... | 709/238 |
| 7,590,074 B1 * | 9/2009 | Dondeti et al. .............. | 370/254 |
| 2003/0118036 A1 * | 6/2003 | Gibson et al. ............... | 370/401 |
| 2003/0174706 A1 * | 9/2003 | Shankar et al. ............. | 370/393 |
| 2004/0081154 A1 * | 4/2004 | Kouvelas .................... | 370/392 |
| 2004/0131079 A1 * | 7/2004 | Hegde et al. ................ | 370/466 |
| 2005/0025069 A1 * | 2/2005 | Aysan ........................ | 370/254 |
| 2005/0188106 A1 * | 8/2005 | Pirbhai et al. .............. | 709/238 |
| 2006/0039391 A1 * | 2/2006 | Vasseur et al. ............. | 370/409 |
| 2006/0133265 A1 * | 6/2006 | Lee ............................ | 370/228 |
| 2007/0011351 A1 * | 1/2007 | Bruno et al. ................ | 709/238 |

OTHER PUBLICATIONS

MPLS and Label switching Networks published by Uyless Black on Dec. 2002.*
RFC 2547 BGP/MPLS VPNs published by the Networking Group on Mar. 1999. See whole Document.*
Non Patent Literature "MPLS and Label Switching Networks" published by Black.*
RFC 2547 BGP/MPLS VPNs (Hereinafter RFC 2547) published by the Networking Group on Mar. 1999.*
Rosen, Eric C., RFC 2547bis, IETF, dated Oct. 2004.

* cited by examiner

*Primary Examiner*—Pankaj Kumar
*Assistant Examiner*—Yosief Berhane
(74) *Attorney, Agent, or Firm*—Brinks Hofer Gilson & Lione

(57) ABSTRACT

A method, apparatus and computer program product each provides interconnectivity between autonomous systems. A control plane and a data plane are included in a network device. A single interface is included in the control plane for all customers. An interface is included in the data plane for each respective one of the customers.

18 Claims, 4 Drawing Sheets

INTERCONNECTIVITY BETWEEN AUTONOMOUS SYSTEMS

BACKGROUND

Before discussing the present invention, certain terms, used throughout the description, will be defined.

An Autonomous System Border Router (ASBR) is a router located on an edge of an autonomous system and functions as an autonomous system's link to other routing domains. The ASBR exchanges router information with routers belonging to other routing domains. Such a router has AS external routes that are advertised throughout the autonomous system. The path to each ASBR is known to every other router in the autonomous system.

Routers support Virtual Routing and Forwarding instances (VRFs). A VRF includes a network address routing table, a derived forwarding table, a set of interfaces or VLANs that use the forwarding table, and a set of rules and routing protocols that determine what goes into the forwarding table.

A Virtual Private Network (VPN) is a network that uses a public telecommunication infrastructure, such as the Internet, to provide remote offices or individual users with secure access to their organization's network. A VPN works by using the shared public infrastructure while maintaining privacy through security procedures and tunneling protocols.

Multi-Protocol Border Gateway Protocol (MPBGP) is an exterior gateway routing protocol that enables groups of routers (called autonomous systems) to share routing information so that efficient, loop-free routes can be established.

Multi-Protocol Label Switching (MPLS) is a standards-approved technology for speeding up network traffic flow and making it easier to manage. MPLS involves setting up a specific path for a given sequence of packets, identified by a label put in each packet, thus saving the time needed for a router to look up the address to the next node to forward the packet to. MPLS is called multiprotocol because it works with the Internet Protocol (IP), Asynchronous Transport Mode (ATM), and frame relay network protocols.

A Service Level Agreement (SLA) is a contract between a network service provider and a customer that specifies, usually in measurable terms, what services the network service provider will furnish. Many Internet service providers (ISP)s provide their customers with an SLA. More recently, IS departments in major enterprises have adopted the idea of writing a service level agreement so that services for their customers (users in other departments within the enterprise) can be measured, justified, and compared with those of outsourcing network providers.

Routing type (RT) identifies a particular routine header variant. If a router does not recognize the routing type value, it must discard the packet.

Route distinguisher (RD) is an address qualifier used to distinguish the distinct Virtual Private Network (VPN) routes of separate customers who connect to the provider. The route distinguisher is an 8-byte field prefixed to the customer's Internet Protocol address (IPv4). The resulting 12-byte field is a unique "VPN-IPv4" address. The route distinguisher is used to make IPv4 or Ipv6 prefixes globally unique. It is not used for forwarding, but it is used by the routers BGP process to identify each prefix as unique, even though the 4 byte IP-address may be equal. For example, for a PE router to be able to distinguish between the IP address 10.0.0.0 of one customer from the 10.0.0.0 of another customer, the network administrator must add a unique route distinguisher to each.

On the Internet and in other networks, QoS (Quality of Service) is the idea that transmission rates, error rates, and other characteristics can be measured, improved, and, to some extent, guaranteed in advance. QoS is of particular concern for the continuous transmission of high-bandwidth video and multimedia information. Transmitting this kind of content dependably is difficult in public networks using ordinary "best effort" protocols. Using the Internet's Resource Reservation Protocol (RSVP), packets passing through a gateway host can be expedited based on policy and reservation criteria arranged in advance. Using ATM, which also lets a company or user preselect a level of quality in terms of service, QoS can be measured and guaranteed in terms of the average delay at a gateway, the variation in delay in a group of cells (cells are 53-byte transmission units), cell losses, and the transmission error rate.

A Label Forwarding Information Base (LFIB) is a subset of a Label Information Base (LIB). The LFIB contains an incoming label, an outgoing label, a next hop and an outgoing interface. The LFIB contains what is actually being used to forward packets via label swapping, whereas the LIB contains all possible routes (generated by the underlying routing Link State Protocol) with labels already assigned (assuming frame mode MPLS). The LFIB has only routes that are considered "best" by the routing protocols. The LIB has IP information, label and interface information, but no indication of which is the shortest path to the given destination. Any route in the LFIB will also be in the LIB, but not the other way around.

The industry has standardized on a few Inter-Autonomous System (AS) models that the service providers may deploy. The current industry standards for Inter-AS solutions include the models defined as 10a (also referred to as option A), 10b (also referred to as option B), and 10c.

The first model defined and deployed by many service providers is the 10a model. The 10a model requires the provider to build on their ASBR a VRF per VPN, a unique peering interface per VRF, and a unique routing process per VRF. The peer ASBR does the same thereby creating a one-for-one relationship between the two ASBR's. The advantages of the 10a model include discrete interfaces facilitating QoS mechanisms and explicit resource management methods that protect the memory and processing resources. Likewise, the exposure of the ASBR and the attached network is limited.

The second model defined and deployed by a few service providers is the 10b model. The 10b model only requires the provider to build a single interface for each peer and a single routing process on the interface. The routing process (MP-BGP) is able to maintain the segregation of VPN prefixes without having to use discrete VRF's per VPN. The advantages include less memory consumption for the routing prefixes and interfaces, less processor consumption for the routing process, and automatic VPN session binding between the ASBR's.

The third model defined and rarely deployed by service providers is the 10c method. The 10c model only requires the provider to build a single interface for each peer and a single routing process on the interface. A routing process (MP-BGP) is able to maintain the segregation of VPN prefixes without requiring a presence on the ASBR. The advantages include even less memory consumption for the routing prefixes since the VPN prefixes are passed around the ASBR. The ASBR has even less processor consumption since the ASBR serves as a core device providing connectivity between the two AS's.

The two most commonly used models—10a and 10b—have orthogonal capabilities. Where 10a is strong, 10b is weak and vice-a-versa. Table 1 provides a synopsis of the existing solutions.

TABLE 1

| ASBR | 10a | 10b | 10c |
| --- | --- | --- | --- |
| Routing | Many | One | One |
| Interfaces | Many | One | One |
| Memory | Per-prefix | Per-label | Per-label |
| QoS | Per-VPN | Global | Global |
| Configuration | Manual | Dynamic | Dynamic |
| Resource | Strong | Weak | Weak |
| Security | Strong | Weak | Very Weak |

Routing processes are complex state machines that keep track of the prefixes and the paths to reach the prefixes. Routing processes can be constrained by a number of factors such as the number of peers or adjacencies, the number of routing entries, and the number of potentially viable paths for each routing entry. As the number of prefixes and interfaces increase, the computation complexity increases thereby requiring more processor schedule time. Excessive computational routing complexity on the ASBR may impact any or all the VPN's. As shown in Table 1, the 10a method requires many routing processes, while the 10b and 10c methods require a single routing process.

Interfaces consume memory constructs and typically require an operator to configure the interface and the associate peer entity. The cost of a VPN interface is usually not too cumbersome in an Inter-AS solution as the number of VPNs is typically small. Nevertheless, the interface must be created and correctly associated with the appropriate customer. The 10a method requires many interfaces, while the 10b and 10c methods require a single interface.

Memory is allocated for VPN prefixes. VPN prefixes can create a resource burden on the ASBR. The number of prefixes is not directly controlled by a single provider or customer, but by the aggregate set of operators and customers. For this reason, memory allocated for VPN prefixes may be very precious. The 10a method requires memory on a per-prefix basis, while the 10b and 10c methods require memory on a per-label basis.

The customers of the MPLS VPN are particularly interested in QoS, especially at provider boundaries where SLA's tend to be difficult to enforce. Each enterprise has unique QoS requirements that may be difficult to handle in aggregate; however, provisioning a QoS model per customer is also a challenge especially when there is no discrete point where the QoS model may be applied. The 10a method requires QoS on a per-VPN basis, whereas the 10b and 10c methods require QoS on a global basis.

The Inter-AS model requires a configuration that establishes a relationship between the ASBR's for each VPN. The configuration should be simple to implement and should be easy to replicate. The 10a method requires more manual configuration, while the 10b and 10c methods utilize dynamic configuration.

Resources (memory, interfaces, and processor schedule time) are precious for a service provider. In particular, the provider is interested in conducting "One Time Provisioning" for many services. In addition, the management of the allocated resources can become a burden. To minimize the Operation Expenditures, the provider will frequently over-provision many of the components in a solution if the Capital Costs of the components are negligible. On the contrary, the expensive components are monitored closely and judiciously allocated. Resource management plays a critical role insuring SLA's are met. The 10a method provides strong resource management, while the 10b and 10c methods provide weak resource management.

Closely related with resource management is security. Security requirements permeate the solution such that the provider can protect their assets, their ability to provide services, as well as one customer from another customer. Security is based on a risk management model where the law of diminishing returns plays a critical role. The cost of security (capital costs, functional costs, operational costs) must be balanced against the potential risk (liability costs, credibility, etc.). Clearly, failure to address the security requirements of a solution makes the previous points highlighted somewhat pointless. The 10a method provides for strong security, while the 10b method provides weaker security and the 10c method provides even weaker security than the 10b method.

Customers of a 2547bis-based VPN service often need to connect to multiple Service Providers in order to achieve connectivity for all of their sites. The Service Providers need to setup peering points where they exchange VPN prefixes and data traffic. The various types of connections between 2547bis Service Providers are described in draft-ietf-13vpn-rfc2547bis-03.txt.

Many providers select the peering based on a per-VRF basis, i.e. for each customer (VRF), they have a dedicated interface (either physical or logical) where they exchange customer prefixes and traffic. This is a good solution from a security and QOS point of view, the individual customers are isolated from each other and customer SLAs could be applied on such interfaces. This option is called option A, since it's documented as such in chapter 10 paragraph A in draft-ietf-13vpn-rfc2547bis-03.txt.

However, this option does not scale well with the increase in the number of customers. There are two areas where scalability becomes an issue—their needs to be one interface for each customer, and one routing protocol session running on that interface. The routing protocol session is usually BGP-4. This idea addresses the second limitation —the need to have one routing protocol session per customer.

SUMMARY

Conventional mechanisms such as those explained above suffer from a variety of deficiencies. One such deficiency is that the conventional 10a model consumes more resources on the ASBR which limits the scalability of the model. Resources include establishment of routing entries, interfaces, and routing processes. Routing entries and interfaces consume memory while routing processes consume processing resources. In addition, each of the constructs must be manually configured per customer.

Regarding the 10b model, the single interface exposes the ASBR (and the attached provider network) to the peer network and their customers. There is no distinct point of enforcement for applying resource management and QoS mechanisms on a per customer basis.

Embodiments of the invention significantly overcome such deficiencies and provide mechanisms and techniques that provide a combination of interprovider options A and B to provide a scalable 2547bis interconnect environment.

In a particular embodiment of a method for providing autonomous system interconnect, the method includes decoupling a control plane and a data plane for a network device. The method also includes providing a single interface for control plane exchange for all customers for the network device and providing an interface for each customer for that customer's data plane for the network device.

Other embodiments include a computer readable medium having computer readable code thereon for providing autonomous system interconnect. The medium includes instructions for decoupling a control plane and a data plane for a network device. The computer readable medium further includes instructions for providing a single interface for control planes for all customers for the network device, and instructions for providing an interface for each customer for that customer's data plane for the network device.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides concatenation of interprovider models A and B as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing concatenation of interprovider models A and B as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

VPN customers often need to connect to multiple RFC2547-bis service providers in order to achieve connectivity for all their sites. The service providers need to setup peering points where they exchange VPN prefixes and data traffic. The various types of connections between RFC2547-bis service providers are described in draft-ietf-l3vpn-rfc2547bis-03.txt.

Many providers select the peering based on per-VRF basis, i.e. for each customer (VRF), they have a dedicated interface (either physical or logical) where they exchange customer prefixes and traffic. This is a good solution from security and QOS point of view, the individual customers are isolated from each other and customer SLAs could be applied on such interfaces. This option is called option A, since it's documented in chapter 10 paragraph A in draft-ietf-l3vpn-rfc2547bis-03.txt.

However, this option does not scale well with the number of customers. There are two areas where scalability becomes an issue—their needs to be one interface for each customer, and one routing protocol session running on that interface. The routing protocol session is usually BGP.

Regarding the option B model, the single interface exposes the ASBR (and the attached provider network) to the peer network and their customers. There is no distinct point of enforcement for applying resource management and QoS mechanisms on a per customer basis.

The present method and apparatus for performing concatenation of interprovider models A and B for an autonomous system interconnect decouples control and data planes on network devices (e.g., ASBRs), preserving per customer data forwarding on separate interfaces from option A, and using a single BGP VPNv4 or VPNv6 session between the ASBRs from option B. This allows better scaling of the routing protocol sessions between the adjacent ASBRs. Only one BGP session is needed independently of the number of customers that are connected to both providers. Data forwarding is still done on individual VRF interfaces, one interface per customer. This separation of customer traffic allows implementation of per-customer SLA (QOS, traffic shaping and policing, etc).

Although the following paragraphs explicitly talk about VPNv4 and IPv4 address families, the feature is fully applicable to VPNv6 and IPv6 address families as well.

Figure 1:
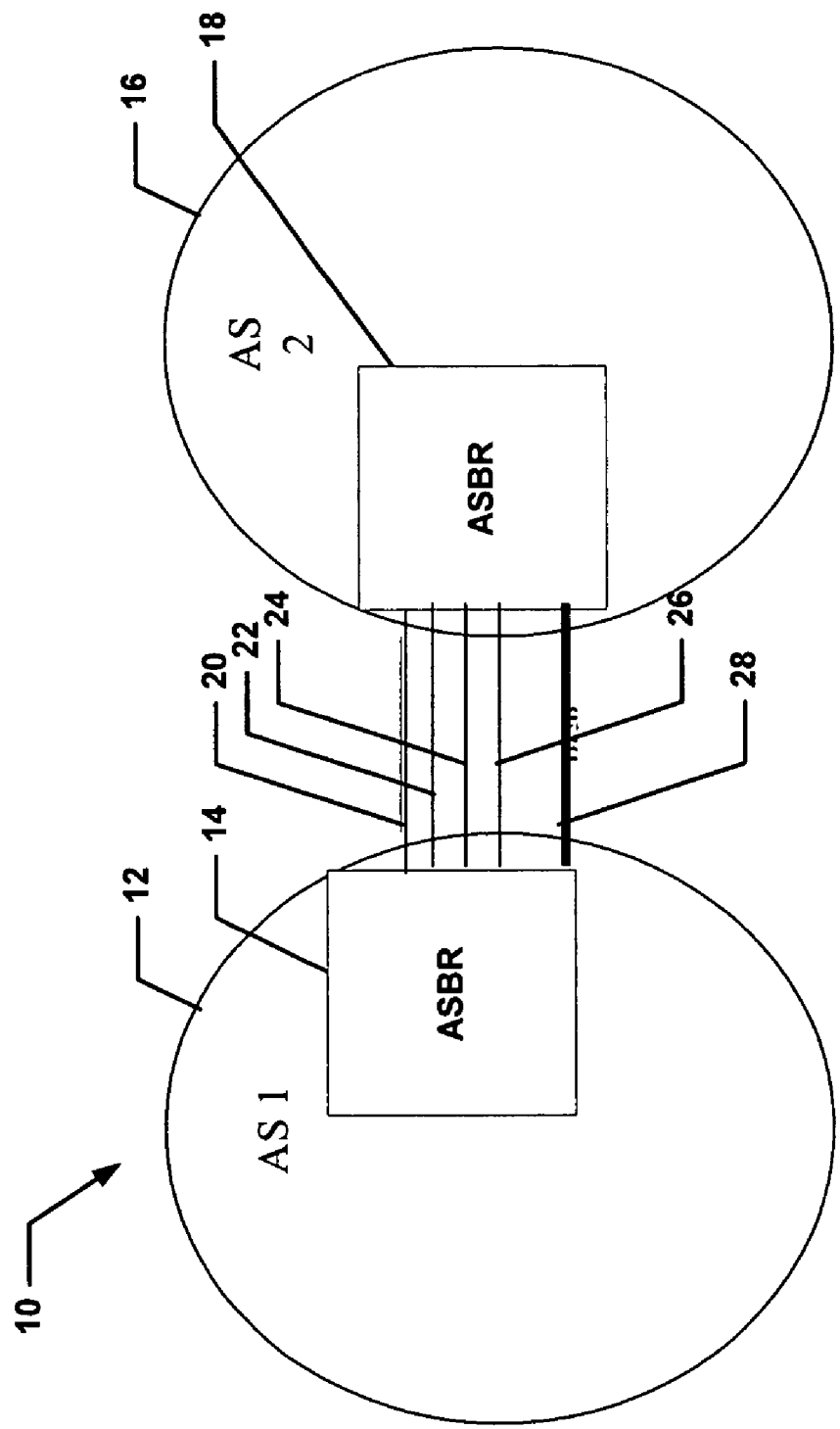
FIG. 1 depicts an environment for providing concatenation of interprovider models A and B in an autonomous system interconnect in accordance with embodiments of the invention.

Referring now to FIG. 1, an environment 10 for providing concatenation of interprovider models A and B in an autonomous system interconnect is shown. A first autonomous system (AS) 12 is shown including a first Autonomous System Border Router (ASBR) 14. The first ASBR 14 is in communication with a second ASBR 18 of second AS 16. Communication between ASBR 16 and ASBR 18 is by way of links 20, 22, 24, 26 and 28. Link 20 is a data plane session for data of a first customer, link 22 is a data plane session for data of a second customer, link 24 is a data plane session for data of a third customer, and link 26 is a data plane session for data of a fourth customer. Link 28 is a routing session for all the customers.

The present concatenation of interprovider models A and B in an autonomous system interconnect requires the installation of VRF forwarding entries. VPN prefixes learned from a remote ASBR are installed in the individual VRFs based on its RT values (and alternately other parameters specified in import maps). This procedure is called import.

VPNv4 prefixes are learned from the remote ASBR via a routing protocol session (e.g., BGP) that is in the global routing table context. Accordingly, in the conventional method, the learned nexthop address is also in the global routing table context. In order to force the traffic to go via the VRF interfaces, it is necessary to install the VRF forwarding entries using a nexthop that is in the importing VRF context. The address of the nexthop could be the same as the address of the remote ASBR in the global table, this would require to use the same IP addresses on the VRF interfaces as the corresponding global table VPNv4 session. If the provider needs to number the VRF interfaces differently from the global table VPNv4 session, a configuration command is used to map the corresponding global table VPNv4 neighbor address to an IP address reachable in the given VRF. In one embodiment the command is "nexthop map <global_nexthop><vrf_nexthop>" in the VRF configuration submode. Alternatively, the nexthop and nexthop context (VRF) could be set in inbound route map.

The advertising of the prefixes (learned from A+B peer) to IBGP peers has certain complications. First of all, the ASBR needs to always do next-hop-self towards the IBGP peers, so the traffic for the given prefix arrives at the ASBR which can route it to the VRF interface.

In certain scenarios, the prefix is imported to a single VRF, and has the same RD. In this situation, the ASBR advertises the prefix as is, only with doing next-hop-self.

When the prefix is imported to a single VRF with a different RD, the import process produces a new VPNV4 prefix with the RD of the VRF, and the IP prefix from the original VPNv4 prefix. The BGP table has two VPNv4 prefixes, the learned one, and the one created by import process. Conventional BGP behavior is that the learned one is advertised towards the other VPNv4 peers, but this is not the desired behavior here, since the learned prefix is not associated with any VRF. Instead, it is desirable to advertise the imported prefix (as if the prefix was learned on a VRF interface), but customers may want to also advertise the learned one. By default, the learned prefixes (except of the "same RD" import cases) are not advertised. If desired, some mechanism could be added to advertise the learned prefixes in addition to the imported ones. If the learned prefix is advertised with changed nexthop, it may be necessary to also install the VPNv4 MPLS forwarding entry.

When the prefix is imported into multiple VRFs, multiple VPNv4 copies with the appropriate RDs are created by the import process. In order to route the traffic (coming from other PEs towards this prefix) via the appropriate VRF interface, all the imported prefixes are advertised with a separate label. Remote PEs will need to select the right ones for installing to the appropriate VRFs.

When advertising the imported prefixes, the question is what to do with the learned RTs. Advertising the prefix as is would make it difficult to do the import correctly on the PEs. One way is to manipulate the RTs in an outbound route map (using RT rewrite feature). However, using the mechanisms described within this invention, by default, all RTs are deleted and only those specified in the "export" statement in the given VRF are added (to behave as if the prefix was learned on the VRF interface).

It's possible that a prefix is not imported into any VRF. A customer may use regular option B style forwarding for those prefixes (and install the VPNv4 MPLS forwarding entries), or just drop such prefixes altogether. This is controlled by the existing command "no bgp default route-target filter".

In the conventional implementation of option B, the VPNv4 MPLS forwarding entries are created when a label is allocated and prefix advertised to a BGP peer. Since the advertising of the learned prefixes is suppressed (the imported ones are advertised instead), no VPNv4 entries forwarding will be installed. If the mechanism is added for allowing the learned prefixes to be advertised, the VPNv4 entries are installed as usual upon the label allocation.

In certain environments, the end customer may run a MPLS network, so the service providers need to be able to exchange MPLS labels and forward MPLS packets on the PE-CE interfaces. When carrying such a MPLS enabled VRF between the A+B ASBRs, there is also a need to exchange labeled packets between the ASBRs. The ASBR VRF interfaces are configured with "mpls bgp forwarding" to allow processing of MPLS packets on the VRF interfaces.

There are multiple solutions for determining whether there is a need to install the rewrite with or without the outgoing label.

One solution is when installing MPLS forwarding entries for interface with "mpls bgp forwarding" enabled, the learned outlabel is used, while without the command, packets are sent from such an interface as unlabeled. Configuring or removing this command on an interface would require a walk of the given VRF routing table and update the forwarding entries.

Another solution requires a new command (different from "mpls bgp forwarding") which is used on the interface to enable/disable outlabel imposition. Again toggling this command requires a RIB walk.

Yet another solution is to use an inbound route map on the VPNv4 session to mark the entries that need to be installed with an outlabel. Changes in the route map would require a soft clear of the session.

The present method and apparatus providing concatenation of interprovider models A and B in an autonomous system interconnect allows improved scaling of the routing protocol sessions between the adjacent ASBRs. Only one MP-BGP session is needed independently of the number of customers that are connected to both providers. Data forwarding is still done on individual VRF interfaces, one interface per customer. This separation of customer traffic allows simple implementation of per-customer SLA (QOS, traffic shaping and policing, etc).

Figure 2A:
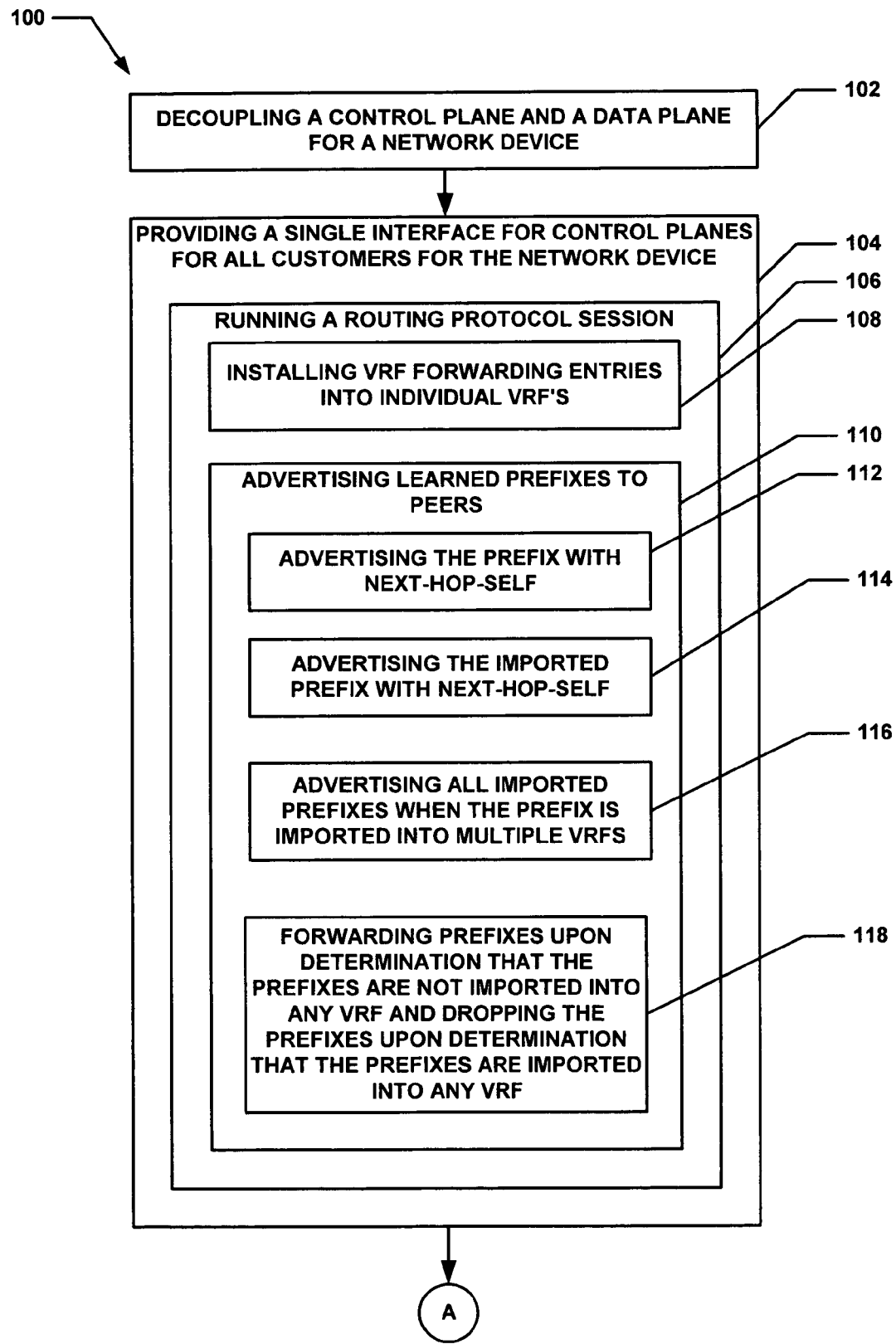
FIGS. 2A and 2B comprise a flow diagram of a particular embodiment of a method for providing concatenation of interprovider models A and B in an autonomous system interconnect in accordance with embodiments of the invention.
Figure 2B:
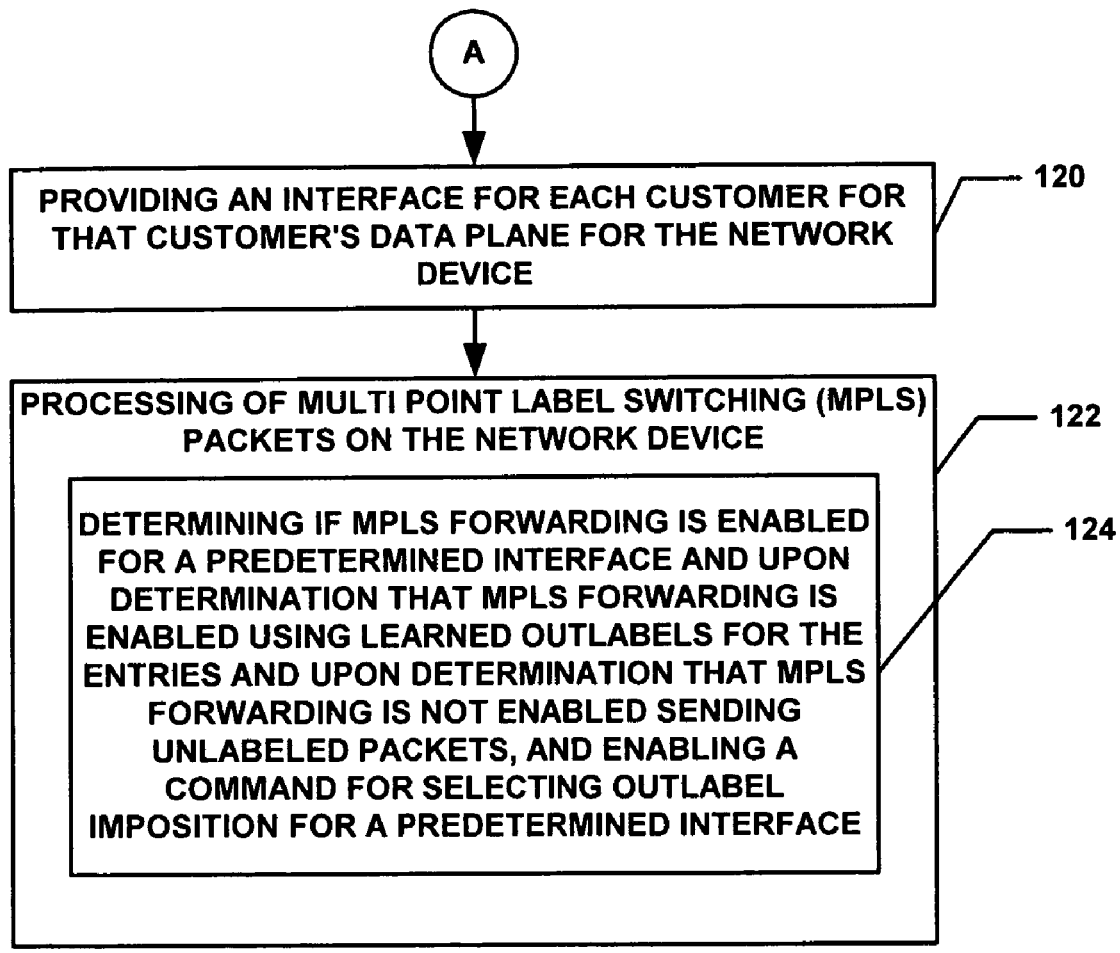

A flow chart of the presently disclosed method is depicted in FIGS. 2A and 2B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a particular embodiment of a method 100 of providing concatenation of interprovider models A and B in an autonomous system interconnect is shown. The method 100 begins with processing block 102 which discloses decoupling a control plane and a data plane for a network device. This is accomplished, for example, by running the protocol defined by chapter 10 paragraph A in draft-ietf-l3vpn-rfc2547bis-03 (option A) for the data plane, and by running the protocol defined by chapter 10 paragraph B in draft-ietf-l3vpn-rfc2547bis-03 (option B) for the control plane.

Processing block 104 states providing a single interface for control planes for all customers for the network device. As described in processing block 106, this requires running a routing protocol session (e.g., BGP). As further described in processing block 108, running a routing protocol session includes installing VRF forwarding entries into individual VRF's. Running a routing protocol also includes, as recited by processing block 110, advertising learned prefixes to peers.

The advertising of learned prefixes to peers can be accomplished in several manners for various scenarios. In processing block 112, advertising learned prefixes comprises advertising the prefix with next-hop-self. This is done when the learned prefix is imported to a single VRF and said VRF has a same Route Distinguisher (RD) as the prefix. In processing block 114, advertising learned prefixes comprises advertising the imported prefix with next-help-self. This is done when the prefix is imported to a single VRF having a different Route Distinguisher (RD) than an RD of the prefix and setting the next-hop accordingly. In processing block 116, advertising learned prefixes comprises advertising all imported prefixes when the prefix is imported into multiple VRFs. In processing block 118, advertising learned prefixes comprises one of the group comprising forwarding prefixes upon determination that said prefixes are not imported into any VRF and dropping said prefixes upon determination that said prefixes are imported into any VRF.

Processing continues with processing block 120 which discloses providing an interface for each customer for that customer's data plane for said network device. In this way, data forwarding is done on individual VRF interfaces, one interface per customer. This separation of customer traffic allows implementation of per-customer SLA (QoS, traffic shaping and policing, etc.).

In some embodiments it may be desirable to process MPLS packets. Processing block 122 recites processing of Multi Point Label Switching (MPLS) packets on the network device. The processing of MPLS packets may be accomplished in multiple ways. Processing block 124 states processing of MPLS packets comprises determining if MPLS forwarding is enabled for a predetermined interface and upon determination that MPLS forwarding is enabled using learned outlabels for the entries and upon determination that MPLS forwarding is not enabled sending unlabeled packets, and further by enabling a command for selecting outlabel imposition for a predetermined interface.

Figure 3:
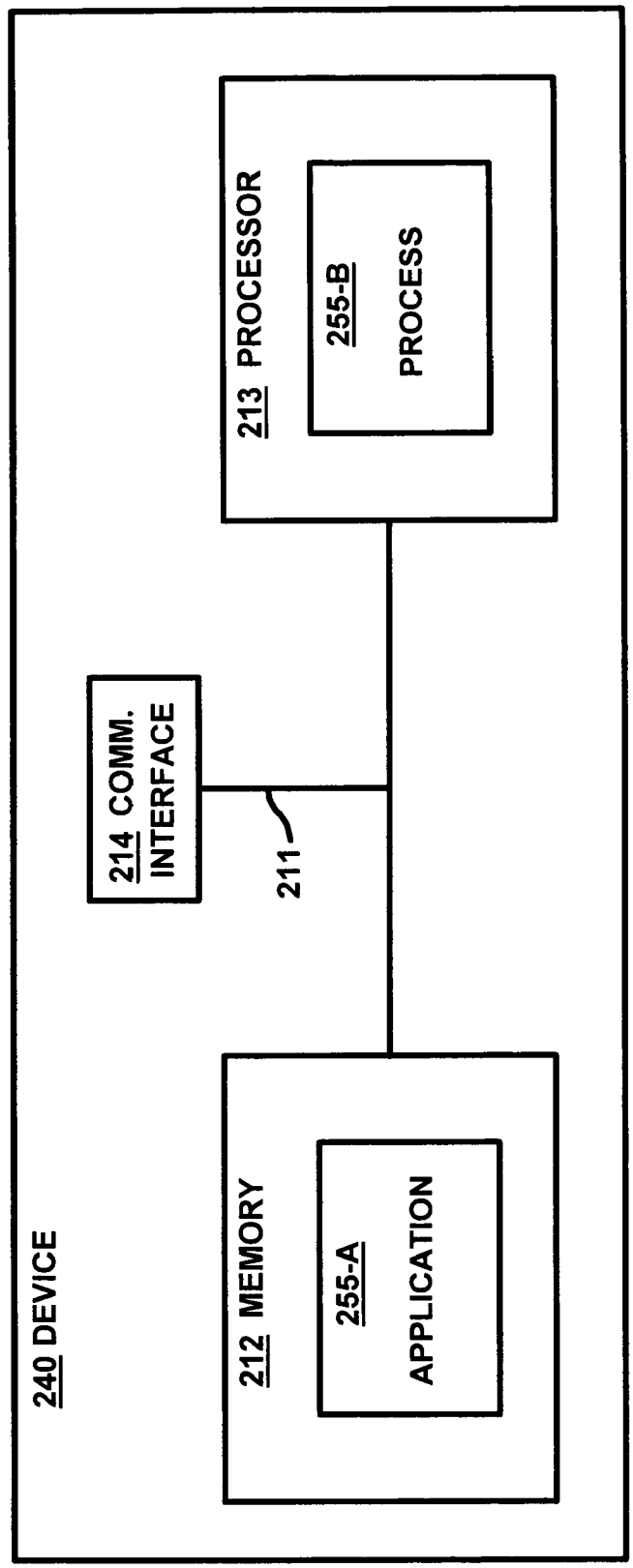
FIG. 3 illustrates an example network device architecture for a computer system that provides concatenation of interprovider models A and B in an autonomous system interconnect in accordance with embodiments of the invention.

FIG. 3 illustrates example architectures of a network device that is configured as a host computer system 240. The network device 240 may be any type of network device such as an ASBR or the like. In this example, the device includes an interconnection mechanism 211 that couples a memory system 212, a processor 213, and a communications interface 214. The communications interface 214 allows the device 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention, it will now become apparent to those of ordinary skill in the art that other embodiments incorporating these concepts may be used. Additionally, the software included as part of the invention may be embodied in a tangible computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that the invention should not be limited to the described embodiments but rather should be limited only by the spirit and scope of the appended claims.

What is claimed is:

1. A method of providing an autonomous system (AS) interconnect, the method comprising:

including a control plane and a data plane in a network device, the network device in a first AS;

providing a single interface in the control plane for a plurality of Virtual Routing and Forwarding instances (VRFs) configured in the network device;
running one routing protocol session on the single interface for all of the VRFs; and
providing a plurality of interfaces in the data plane, each one of the interfaces for a respective one of the VRFs, wherein providing the interfaces in the data plane comprises including each one of the interfaces in a respective one of the VRFs, and wherein running the one routing protocol session includes:
learning at least two Virtual Private Network (VPN) prefixes from data received from a second AS over the single interface via the one routing protocol session;
installing VRF forwarding entries into at least two of the VRFs, each one of the VRF forwarding entries corresponding to a respective one of the at least two VPN prefixes, a first one of the at least two VPN prefixes being imported into a single one of the at least two of the VRFs, and a second one of the at least two VPN prefixes being imported into the at least two of the VRFs; and
advertising at least two imported VPN prefixes at the network device in response to the second one of the at least two VPN prefixes being imported into the at least two of the VRFs, each of the at least two imported VPN prefixes identifying a respective one of the at least two of the VRFs, each of the at least two imported VPN prefixes being different from the second one of the at least two VPN prefixes, and each of the at least two imported VPN prefixes being different from the other of the at least two imported VPN prefixes.

2. The method of claim 1 wherein running the one protocol_session includes advertising a plurality of learned prefixes to peers from the network_device, the learned prefixes including the at least two VPN prefixes.

3. The method of claim 2 wherein advertising the learned prefixes comprises advertising the learned prefixes with next-hop-self.

4. The method of claim 1 further comprising forwarding a plurality of learned prefixes in response to determining said learned prefixes are imported into any one of the VRFs and dropping said learned prefixes in response to determining said learned prefixes are not imported into any one of the VFRs, the learned prefixes including the at least two VPN prefixes.

5. The method of claim 2 wherein running the one routing protocol session includes processing of Multi Point Label Switching (MPLS) packets on said network device.

6. The method of claim 1 further comprising determining if MPLS forwarding is enabled for a determined one of the interfaces in the data plane and, upon a determination that MPLS forwarding is enabled, using learned outlabels for said VRF forwarding entries and upon a determination that MPLS forwarding is not enabled sending unlabeled packets, and enabling a command for selecting outlabel imposition for the determined interface.

7. The method of claim 1 wherein the network device includes a first Autonomous System Border Router (ASBR), said first ASBR in communication with a second ASBR in the second AS, wherein running the one routing protocol session comprises running a Border Gateway Protocol (BGP), the method further comprising advertising a plurality of learned prefixes to a plurality of peers in the first AS, the learned prefixes including the at least two VPN prefixes, and wherein advertising the learned prefixes comprises:
advertising one of the learned prefixes as is with next-hop-self at the first ASBR in response to determining the one of the learned prefixes is imported into the single one of the VRFs having a same Route Distinguisher (RD) as the one of the learned prefixes;
advertising an imported prefix at the first ASBR in response to determining the one of the learned prefix is imported into the single one of the VRFs having a different Route Distinguisher (RD) than the one of the learned prefixes;
advertising, at the first ASBR, all imported prefixes corresponding to the one of the learned prefixes when the one of the learned prefixes is imported into the at least two of the VRFs; and
dropping said one of the learned prefixes at the first ASBR in response to determining said one of the learned prefixes is not imported into any of the VRFs.

8. A network device comprising:
a memory;
a processor;
a communications interface;
an interconnection mechanism coupling the memory, the processor and the communications interface; and
wherein the memory includes computer readable instructions, the computer readable instructions when executed by the processor:
provide a control plane and a data plane in the network device, the network device in a first autonomous system (AS);
provide a single interface in the control plane for a plurality of Virtual Routing and Forwarding instances (VRFs) in the network device, wherein the single interface is included in the communications interface, and wherein the computer readable instructions that provide the single interface also run one routing protocol session in the control plane; and
provide a plurality of interfaces, wherein each one of a plurality of Virtual Routing and Forwarding instances (VRFs) includes a corresponding one of the interfaces, and wherein the computer readable instructions that run the one routing protocol session also:
learn at least two Virtual Private Network (VPN) prefixes from data received from a second AS over the single interface via the one routing protocol session;
install VRF forwarding entries into at least two of the VRFs, each one of the VRF forwarding entries corresponding to a respective one of the at least two VPN prefixes, wherein one of the at least two VPN prefixes is imported into the at least two of the VRFs; and
advertise at least two imported VPN prefixes in response to an import of the one of the at least two VPN prefixes into the at least two of the VRFs, wherein each of the at least two imported VPN prefixes identifies a respective one of the at least two of the VRFs, each of the at least two imported VPN prefixes is different from the one of the at least two VPN prefixes, and each of the at least two imported VPN prefixes is different from the other of the at least two imported VPN prefixes.

9. The network device of claim 8 wherein the computer readable instructions that run one routing protocol session to also advertise a plurality of learned prefixes over the one routing protocol session to peers, the learned prefixes including the at least two VPN prefixes.

10. The network device of claim 9 wherein the computer readable instructions that advertise the learned prefixes advertise the learned prefixes with next-hop-self.

11. The network device of claim 9 wherein the computer readable instructions that advertise the learned prefixes advertise a derived imported prefix with next-hop-self.

12. The network device of claim 9 wherein the computer readable instructions that advertise the learned prefixes advertise a plurality of imported prefixes associated with the at least two VPN prefixes imported into the at least two of the VRFs.

13. The network device of claim 9 wherein the computer readable instructions that advertise the learned prefixes advertise the learned prefixes upon determination that the learned prefixes are imported into any one of the VRFs and dropping the learned prefixes upon determination that the learned prefixes are not imported into any one of the VRFs.

14. The network device of claim 9, wherein the computer readable instructions that run the one routing protocol session also process Multi Point Label Switching (MPLS) packets received in the one routing protocol session at said network device.

15. The network device of claim 14 wherein the computer readable instructions that process MPLS packets also determine whether MPLS forwarding is enabled for a determined interface included in the interfaces in the data plane and, upon a determination that MPLS forwarding is enabled, include learned outlabels for said VRF forwarding entries and, upon a determination that MPLS forwarding is not enabled, send unlabeled packets.

16. The network device of claim 8 wherein the computer readable instructions that run the one routing protocol session also advertise a plurality of learned prefixes to a plurality of peers in the first AS, wherein the peers are peers of the network device, wherein the learned prefixes include the at least two VPN prefixes, and wherein the computer readable instructions that advertise the learned prefixes also:

advertise a learned prefix as is with next-hop-self when the learned prefix is imported to a single one of the VRFs and said single one of the VRFs has a same Route Distinguisher (RD) as the learned prefix;

advertise an imported prefix corresponding to the learned prefix when the learned prefix is imported to a single one of the VRFs and the single one of the VRFs has a different Route Distinguisher (RD) than the learned prefix;

advertise all imported prefixes corresponding to the learned prefix when the learned prefix is imported into the at least two of the VRFs; and drop the learned prefix when the learned prefix is not imported into any one of the VRFs.

17. The network device of claim 8, wherein each of the at least two imported VPN prefixes comprises an Internet Protocol (IP) prefix of the one of the at least two VPN prefixes, each of the at least two imported VPN prefixes further comprises a route descriptor of a respective one of the at least two of the VRFs, the route descriptor of each respective one of the at least two of the VRFs being different from the other of the at least two of the VRFs, and the route descriptor of each respective one of the at least two of the VRFs being different from a route descriptor of the one of the at least two VPN prefixes.

18. The network device of claim 8, wherein the computer readable instructions that advertise the at least two imported VPN prefixes advertise at least two labels, wherein each of the at least two labels corresponds to a respective one of the at least two imported VPN prefixes.

* * * * *

UNITED STATES PATENT AND TRADEMARK OFFICE
CERTIFICATE OF CORRECTION

PATENT NO. : 7,742,477 B1  Page 1 of 1
APPLICATION NO. : 11/347182
DATED : June 22, 2010
INVENTOR(S) : James N. Guichard et al.

It is certified that error appears in the above-identified patent and that said Letters Patent is hereby corrected as shown below:

In Column 11, Line 33, delete "_" after --protocol--.

In Column 11, Line 34, delete "_" after --network--.

In Column 12, Line 57, delete "to" after --session--.

Signed and Sealed this

Tenth Day of August, 2010

David J. Kappos
*Director of the United States Patent and Trademark Office*